Jan. 20, 1925.
H. G. CORDES
ALTERNATING CURRENT WAVE TESTER
Filed Dec. 30, 1920
1,523,516
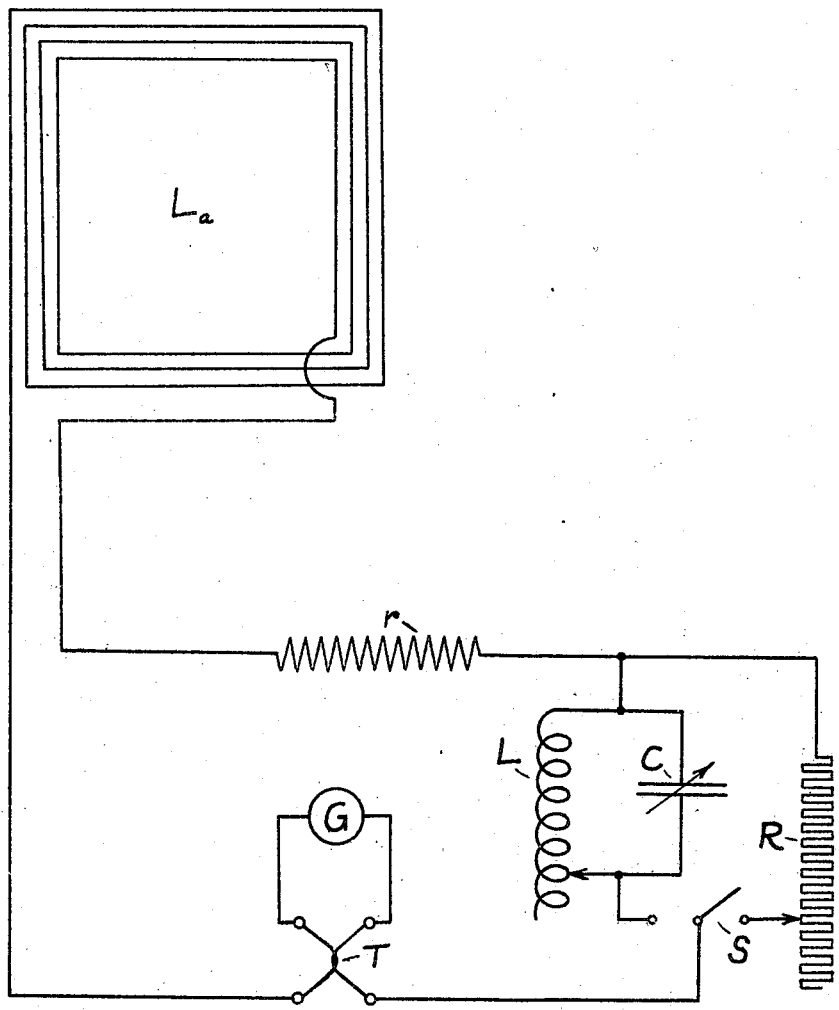
WITNESSES:
INVENTOR
Henry G. Cordes.
BY
ATTORNEY Patented Jan. 20, 1925.

1,523,516

UNITED STATES PATENT OFFICE.

HENRY G. CORDES, OF BREMERTON, WASHINGTON.

ALTERNATING-CURRENT-WAVE TESTER.

Application filed December 30, 1920. Serial No. 434,092.

*To all whom it may concern:*

Be it known that I, HENRY G. CORDES, a citizen of the United States, residing at Bremerton, in the county of Kitsap and State of Washington, have invented a new and useful Alternating-Current-Wave Tester, of which the following is a specification.

My improvement relates to means for determining the quality of alternating current waves with respect to the power of the waves to produce maximum resonance effects in oscillatory circuits. Waves which produce maximum resonance effects or sharpness of resonance are especially valuable in radio signaling in overcoming interference.

The object of my invention is to provide means for comparing the quality of two or more waves, or, comparing a wave of unknown quality with a sine wave. The quality of waves depends mostly on the degree of variation of frequency, the distortion of the wave-form from a sine wave and the rate of change of amplitude of the waves. The ideal wave to produce sharpness of resonance is a sine wave of constant frequency and constant amplitude.

The usual method of determining the quality of waves in radio signaling consists in finding the damping factor or decrement of a damped wave; rate of change of amplitude comprises both decrements and increments. My invention provides means for determining or comparing the quality of continuous waves such as the radio waves emitted by alternators, Poulsen arcs and thermionic current oscillators. Heretofore there has been no satisfactory method of comparing the quality of high frequency sustained waves.

The essential element of the wave tester disclosed in this specification consists of the maximum suppressive impedance of reactances in parallel which constitute a parallel resonance circuit. I have mathematically analyzed and described the theory of a parallel resonance circuit in the Radio Review (London), Vol. II, No. 7, published July, 1921, in which it is shown that the maximum suppressive impedance of reactances in parallel has no reactive component for a pure sine wave having the resonant frequency altho a slight variation of frequency from the resonant frequency introduces a comparatively large reactive component. The suppressive impedance is a maximum at the frequency which makes the sum of the parallel reactances equal to zero. The resonant impedance is the maximum suppressive impedance. The qualities which determine the resonant impedance of waves also determine the quality of waves for selective reception. A preferred form of my improved wave tester is shown by Figure 1 of the accompanying drawing.

Fig. 1 shows a wave tester comprising an inductance L in parallel with a capacitance C which constitute a resonant impedance, a coupling inductance for coil aerial $L_a$, a thermocouple T, a galvanometer G, a coupling circuit resistance $r$, a non-inductive resistance R and a single pole, double throw switch S.

The wave of the generator to be tested is impressed upon $L_a$. The reactance of L in series with C is adjusted for zero reactance at the frequency of the wave to be tested; zero reactance is indicated when the resonant impedance of L and C in parallel is a maximum and the current thru T is a minimum. The galvanometer G indicates the current thru T. The value of R is made equal to the resonant impedance of LC. This value of R is determined by throwing the switch S without changing the value of the current thru T corresponding to parallel resonance. The resistance $r$ renders the coupling circuit aperiodic when the resonant impedance has an effective negative reactive component which affects the evaluation of the impedance.

The value of R increases as the quality of the wave increases. The quality of a wave can be expressed numerically as the ratio of the value of R for the tested wave to the value of R for an ideal or pure sine wave. The resistance R is preferably graduated in ohms and with the corresponding wavelength at which the resonant impedance of LC is equal to R for a pure sine wave. Maximum suppressive impedance can only be attained when no energy is withdrawn from the parallel resonance circuit such as means for determining the current thru L or C; under the condition of no energy withdrawal the resonant impedance for a pure sine wave varies inversely as the ohmic resistance of L and C in series. The equivalent resistance of the parallel resonance circuit is increased if energy is withdrawn as in the secondary of the usual coupled circuit.

The unavoidable current squared times resistance loss in L and C should be reduced to a minimum.

The coil $L_a$ may be replaced with an electrostatic coupling comprising a capacitance. The potential of the wave being tested should be impressed on LC with the minimum reaction from LC; this can be done by increasing both $r$ and the electromotive force impressed on $L_a$.

The term impedance is used in this specification and in the claims as a general term for resistance, reactance or the resultant of resistance and reactance.

The invention claimed is:

1. In means for testing alternating current waves the combination of reactances in parallel constituting a parallel resonance circuit, means for impressing said waves on said reactances in parallel, an auxiliary impedance which can be adjusted in value to equal the resonant impedance of said reactances in parallel and means for impressing said waves on said auxiliary impedance under the same condition that said waves are impressed on said reactances in parallel.

2. In an alternating current wave tester the combination of an aperiodic circuit, means for translating energy from the source of the waves to be tested to said circuit, a parallel resonance circuit in series with said circuit and means for determining the resonant impedance of said parallel resonance circuit to current flowing in said aperiodic circuit, said last-mentioned means comprising a non-reactive resistance and means for substituting said resistance for said parallel resonance circuit in series with said aperiodic circuit.

3. In means for testing alternating current waves the combination of reactances in parallel constituting a resonant impedance, a current indicating device in series with said impedance to indicate the resonant adjustment of said reactances and means for determining the value of said impedance to current having the wave form of said alternating current waves, said impedance being a measure of the quality of said waves.

4. In means for testing alternating current waves the combination of reactances in parallel constituting a resonant impedance; an aperiodic circuit comprising said impedance, a current indicator and means for producing a flow of said alternating current in said circuit; and, means for measuring the value of said resonant impedance in terms of an auxiliary impedance by substituting said auxiliary impedance for said impedance in said aperiodic circuit.

5. An alternating current wave tester in which are combined reactances in parallel constituting a resonant impedance, a non-reactive resistance adjustable to known values and means for passing an alternating current thru either said resonant impedance or thru said non-reactive resistance, the value of said current thru said resistance being equal to the value of said current thru said resonant impedance.

6. The method of testing alternating current waves by means comprising reactances in parallel constituting a parallel resonance circuit which consists in passing said alternating current thru said reactances in parallel, limiting the dissipation of energy in said circuit to the heat losses in said reactances and determining the resonant impedance of said parallel resonance circuit to the flow of said alternating current.

7. The method of determining the quality of alternating current waves with positive and negative reactances in parallel and a non-reactive impedance which consists in adjusting said reactances in parallel to constitute a resonant impedance to the flow of said alternating current and adjusting the value of said non-reactive impedance to the value of said resonant impedance.

8. The method of testing the quality of distorted alternating current waves with respect to the degree of distortion of the waveform of said waves from a sine wave with reactances in parallel which consists in determining the resonant impedance of said reactances in parallel to the flow of alternating current having pure sine waves and having the same frequency as said distorted waves, adjusting said reactances in parallel to constitute a resonant impedance to the flow of said distorted-wave current and comparing said distorted-wave impedance with said pure sine-wave impedance.

Signed at Bremerton, county of Kitsap and State of Washington, this 23rd day of December, 1920.

HENRY G. CORDES.

Witnesses:
G. W. PRESSER,
H. P. BUBKE.